United States Patent
Cheng et al.

(10) Patent No.: US 10,011,074 B2
(45) Date of Patent: Jul. 3, 2018

(54) COLOR THREE-DIMENSIONAL PRINTING APPARATUS AND COLOR THREE-DIMENSIONAL PRINTING METHOD

(71) Applicant: National Taiwan University of Science and Technology, Taipei (TW)

(72) Inventors: Yih-Lin Cheng, Taipei (TW); Freeman Chen, Taipei (TW); Jun-Hao Chen, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 389 days.

(21) Appl. No.: 14/864,834

(22) Filed: Sep. 24, 2015

(65) Prior Publication Data
US 2016/0096322 A1    Apr. 7, 2016

(30) Foreign Application Priority Data
Oct. 1, 2014    (TW) .............. 103134216 A

(51) Int. Cl.
*B29C 64/118*    (2017.01)
*B29C 67/00*    (2017.01)
(Continued)

(52) U.S. Cl.
CPC ........ *B29C 67/0059* (2013.01); *B29C 64/112* (2017.08); *B29C 64/118* (2017.08);
(Continued)

(58) Field of Classification Search
CPC ............... B29C 67/0055–67/96; B29C 64/118
See application file for complete search history.

(56) References Cited

U.S. PATENT DOCUMENTS

| 8,642,692 B1 | 2/2014 | Stockwell et al. |
| 8,665,479 B2 | 3/2014 | Tan et al. |
(Continued)

FOREIGN PATENT DOCUMENTS

| CN | 103517797 | 1/2014 |
| CN | 103817935 | 5/2014 |
(Continued)

OTHER PUBLICATIONS

"Office Action of Taiwan Counterpart Application", dated Jul. 28, 2015, p. 1-p. 6.

*Primary Examiner* — Benjamin A Schiffman
(74) *Attorney, Agent, or Firm* — JCIPRNET

(57) ABSTRACT

A color three-dimensional (3D) printing apparatus configured for forming a colored 3D object is provided. The color 3D printing apparatus includes a stage, a first printing unit, a second printing unit, a color inkjet printing unit, and a curing unit. The first printing unit is configured for providing the stage with a first material. The second printing unit is configured for providing the stage with a second material, and a gap remains between the first material and the second material. The color inkjet printing unit is configured for providing the gap with a colored pigment. The curing unit is configured for curing the colored pigment to form the colored 3D object, and the colored 3D object is composed of a plurality of colored object units stacked together. A color 3D printing method is also provided.

7 Claims, 5 Drawing Sheets

(51) Int. Cl.
  *B33Y 10/00* (2015.01)
  *B33Y 30/00* (2015.01)
  *B29C 64/112* (2017.01)
  *B29C 64/124* (2017.01)
  *B33Y 70/00* (2015.01)
  *B33Y 99/00* (2015.01)
  *B29K 67/00* (2006.01)
  *B29K 55/02* (2006.01)
  *B29C 64/20* (2017.01)

(52) U.S. Cl.
  CPC ............ *B29C 64/124* (2017.08); *B33Y 10/00* (2014.12); *B33Y 30/00* (2014.12); *B33Y 70/00* (2014.12); *B33Y 99/00* (2014.12); *B29C 64/20* (2017.08); *B29K 2055/02* (2013.01); *B29K 2067/046* (2013.01); *B29K 2995/0021* (2013.01); *B29K 2995/0026* (2013.01)

(56) References Cited

U.S. PATENT DOCUMENTS

| | | | | |
|---|---|---|---|---|
| 9,738,031 B2 * | 8/2017 | Mikulak | ............... | B29C 64/118 |
| 9,895,844 B2 * | 2/2018 | Haider | ................. | B29C 64/321 |
| 2012/0231225 A1 * | 9/2012 | Mikulak | ............... | B29C 47/025 |
| | | | | 428/172 |
| 2014/0070461 A1 | 3/2014 | Pax | | |
| 2016/0096322 A1 * | 4/2016 | Cheng | .................. | B33Y 70/00 |
| | | | | 264/255 |
| 2017/0252967 A9 * | 9/2017 | Guillemette | .......... | B29C 64/118 |
| 2017/0274586 A1 * | 9/2017 | Hakkaku | ............. | B29C 67/0059 |
| 2017/0274587 A1 * | 9/2017 | Hakkaku | ............. | B29C 67/0059 |
| 2017/0313048 A1 * | 11/2017 | Hakkaku | ............. | B29C 67/0059 |
| 2018/0036952 A1 * | 2/2018 | Hocker | ................. | B29C 64/40 |
| 2018/0117831 A1 * | 5/2018 | Haider | ................. | B29C 64/106 |

FOREIGN PATENT DOCUMENTS

| | | |
|---|---|---|
| TW | 337763 | 8/1998 |
| TW | I279193 | 4/2007 |
| TW | 201140762 | 11/2011 |
| TW | I395662 | 5/2013 |
| TW | M481136 | 7/2014 |

\* cited by examiner

COLOR THREE-DIMENSIONAL PRINTING APPARATUS AND COLOR THREE-DIMENSIONAL PRINTING METHOD

CROSS-REFERENCE TO RELATED APPLICATION

This application claims the priority benefit of Taiwan application serial no. 103134216, filed on Oct. 1, 2014. The entirety of the above-mentioned patent application is hereby incorporated by reference herein and made a part of this specification.

TECHNICAL FIELD

The disclosure generally relates to a three-dimensional (3D) printing apparatus and a 3D printing method; more particularly, the disclosure relates to a color 3D printing apparatus and a color 3D printing method.

DESCRIPTION OF RELATED ART

Along with the progress in computer-aided manufacturing (CAM) techniques, manufacturers have developed the three-dimensional (3D) printing technology to rapidly build 3D models by applying computer-aided design (CAD) software. Specifically, the 3D printing technology is a collective term referring to a series of rapid prototyping (RP) techniques, and the basic principle is additive manufacturing, where a RP machine moves along an X-Y plane to shape cross-sections of a workpiece through scanning, and the RP machine intermittently moves in a layer-by-layer manner along the Z axis, so as to form 3D objects.

For instance, the conventional fused deposition modeling (FDM) technique allows prototypes to be efficiently created with ease. However, once the FDM technique is applied to manufacture a colored 3D object, the 3D object must be formed and then colored, or the material of the prototype itself has the color required by the resultant 3D object. The former limitation apparently complicates the process of forming the colored 3D object and increases the time spent on said process, while the latter limitation may lead to difficulties in selecting appropriate prototype materials with the required color in consideration of the properties of the existing prototype materials, i.e., manufacturers may not guarantee that the colored pigment required by forming the 3D object can be fused and mixed with the prototype material, and the color of the resultant 3D object may not be as rich as expected. Hence, how to resolve said issues has become one of the major concerns of people having ordinary skill in the art.

SUMMARY

The disclosure is directed to a color three-dimensional (3D) printing apparatus and a color 3D printing method not only for improving the efficiency of manufacturing the colored 3D object but also for enhancing the color rendering property of the resultant colored 3D object.

In an embodiment of the disclosure, a color 3D printing apparatus configured for forming a colored 3D object is provided. The color 3D printing apparatus includes a stage, a first printing unit, a second printing unit, a color inkjet printing unit, and a curing unit. The first printing unit is configured for providing the stage with a first material. The second printing unit is configured for providing the stage with a second material, and a gap remains between the first material and the second material. The color inkjet printing unit is configured for providing the gap with a colored pigment. The curing unit is configured for curing the colored pigment to form the colored 3D object, and the colored 3D object is composed of a plurality of colored object units stacked together.

In an embodiment of the disclosure, a color 3D printing method for forming a colored 3D object on a stage is provided. The colored 3D object is composed of a plurality of colored object units stacked together. The color 3D printing method includes steps as follows. A first material layer is formed on the stage. A second material layer is formed along an inner profile of the first material layer, and a colored pigment is provided. Here, a gap remains between the first material layer and the second material layer, and the colored pigment is in the gap. The colored pigment is cured to form a colored layer, and one of the colored object units contains the first material layer, the colored layer, and the second material layer.

In view of the above, the color 3D printing apparatus may be applied to print the colored 3D object through conducting the color FDM technique. Here, the first printing unit and the second printing unit may respectively spray a transparent material and a white material onto the stage, so as to form the transparent first material layer and the white second material layer, respectively. Particularly, the second printing unit sprays the white material along the inner profile of the transparent material, and a gap remains between the transparent material and the white material; thereby, in the subsequent manufacturing process, the color inject printing unit may be applied to deposit the colored pigment into the gap, and the deposited colored pigment is attached to the first material layer and the second material layer. The deposited colored pigment attached to the first material layer and the second material layer can then be cured by the ultraviolet light projected from the curing unit adjacent to the color inkjet printing unit, so as to form the colored layer. Since the first material layer is a transparent color, and the second material layer is a white layer that can raise the color rendering level of the colored layer, viewers are able to clearly identify the color of the colored layer between the first material layer and the second material layer. In other words, the color 3D printing apparatus and the color 3D printing method provided herein can be applied not only for improving the efficiency of manufacturing the colored 3D object but also for enhancing the color rendering property of the resultant colored 3D object.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the inventive principles of the disclosure.

DETAILED DESCRIPTION OF DISCLOSED EMBODIMENTS

Figure 1:
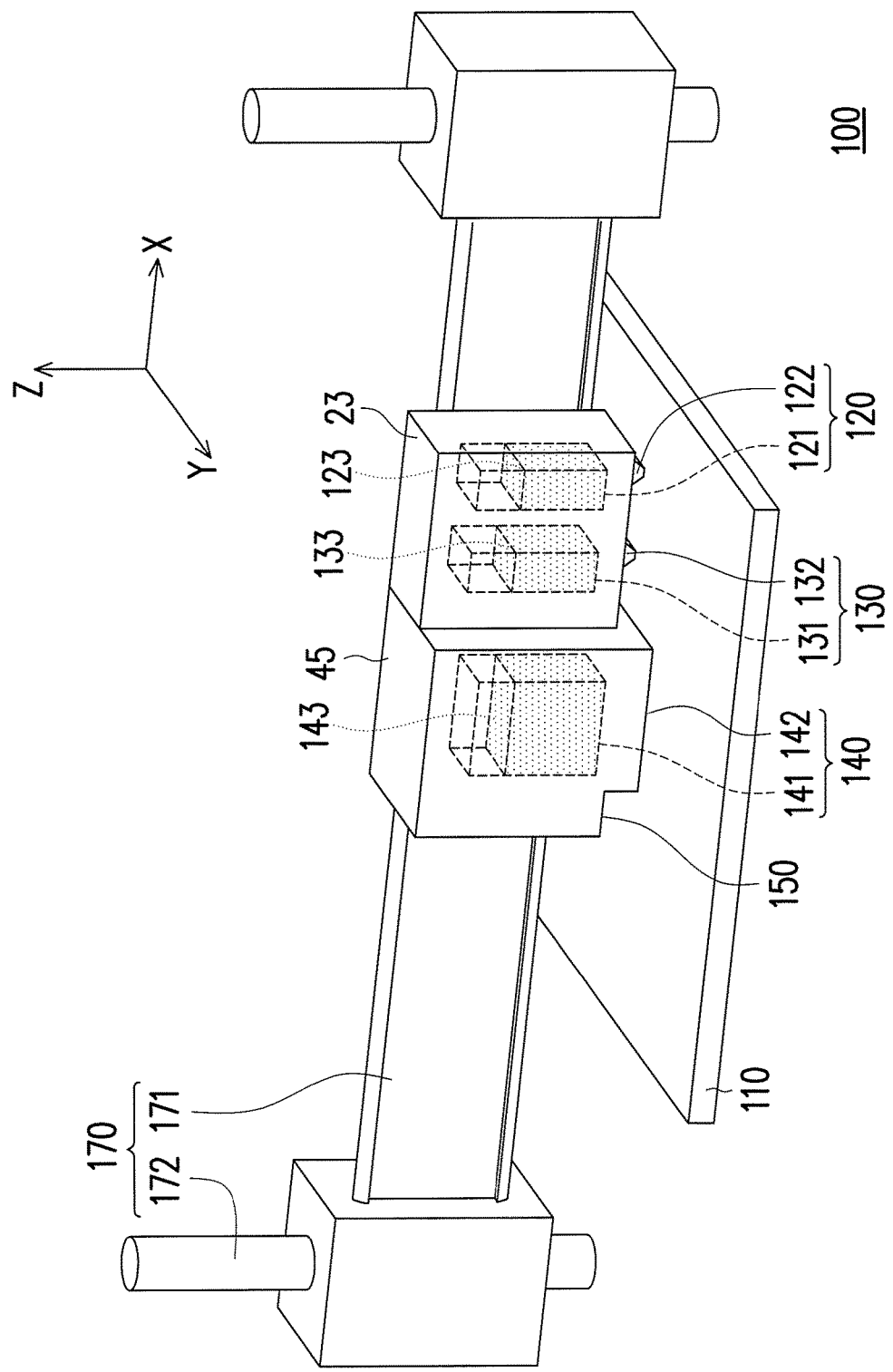
FIG. 1 is a schematic view illustrating a color 3D printing apparatus according to an embodiment of the disclosure.

FIG. 1 is a schematic view illustrating a color 3D printing apparatus according to an embodiment of the disclosure. With reference to FIG. 1, in the present embodiment, the color 3D printing apparatus 100 is, for instance, an FDM 3D printing apparatus suitable for forming two-dimensional (2D) object units (especially the colored object units 11 shown in FIG. 2C) layer by layer based on the profiles of plural slices of a 3D model, and the stacked colored object units 11 may together constitute the colored 3D object 10 (shown in FIG. 2D).

The color 3D printing apparatus 100 includes a stage 110, a first printing unit 120, a second printing unit 130, a color inkjet printing unit 140, and a curing unit 150. The stage 110 may serve to hold the first printing unit 110 and the thermal-melting material sprayed by the first printing unit 110. Here, the stage 110 is suitable for moving back and forth along the Y axis. The first printing unit 120 may include a material feeding tray 121 and a print head 122. The material feeding tray 121 may serve to hold the first material 123 (e.g., a transparent material) with thermal melting properties and may communicate with the print head 122, so as to send the first material 123 to the print head 122. The second printing unit 120 may include a material feeding tray 131 and a print head 132. The material feeding tray 131 may serve to hold the second material 133 (e.g., a white material) with thermal melting properties and may communicate with the print head 132, so as to send the second material 133 to the print head 132. The first printing unit 120 and the second printing unit 130 may be arranged in parallel, so as to form a first printing module 23 with dual extruders; however, the disclosure is not limited thereto.

In another aspect, the color inkjet printing unit 140 may include a material feeding tray 141 and a print head 142. The material feeding tray 141 may serve to hold the colored pigment 143 and may communicate with the print head 142, so as to send the colored pigment 143 to the print head 142. Here, the colored pigment 134 is, for instance, light curing resin and may include a red pigment, a cyan pigment, a yellow pigment, a black pigment, a transparent pigment, a white pigment, or a combination thereof, so as to mix the color required by each of the color object units 11 (shown in FIG. 2C). The curing unit 150 may be an ultraviolet light curing unit, and the curing unit 150 and the color inkjet printing unit 140 may be arranged in parallel, so as to form the second printing module 45.

In the present embodiment, the color 3D printing apparatus 100 may further include a moving unit 170 arranged on the stage 110, and the first printing module 23 and the second printing module 45 are arranged on the moving unit 170. Particularly, the first printing module 23 and the second printing module 45 are movably arranged on a sliding shaft 171 (in the moving unit 170) extending along the X axis, for instance, and the sliding shaft 171 is movably arranged on the sliding shaft 172 (in the moving unit 170) extending along the Z axis, for instance. That is, the first printing module 23 and the second printing module 45 may be guided by the sliding shaft 171, so as to move back and forth along the X axis relative to the stage 110. The sliding shaft 171 may be guide by the sliding shaft 172, so as to move back and forth along the Z axis relative to the stage 110; thereby, the relative distance between the stage 110 and the first and second printing modules 23 and 45 can be modulated.

Figure 2A:
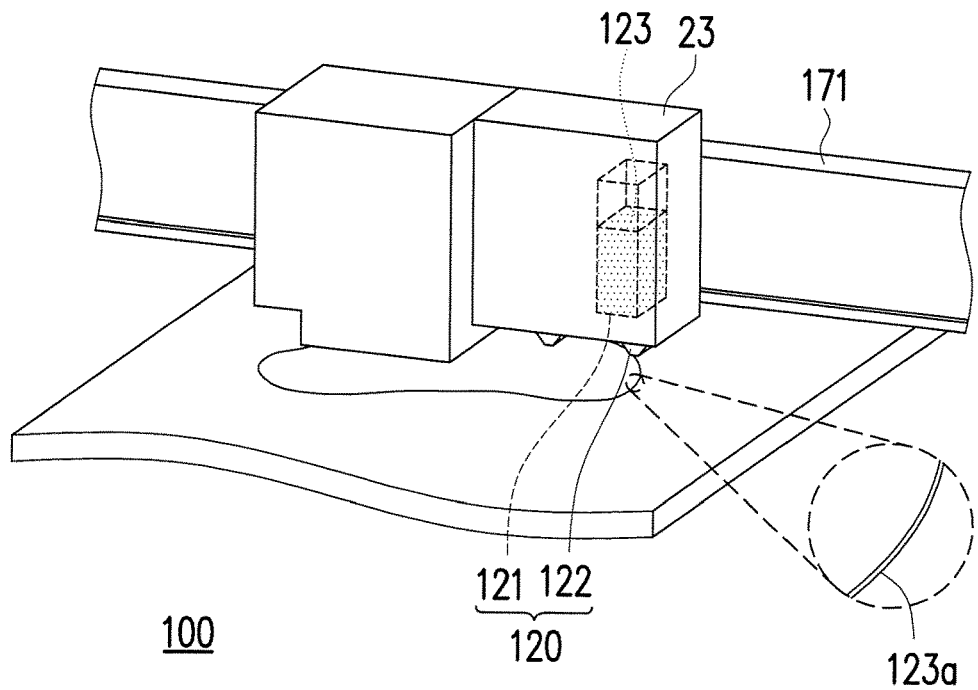
FIG. 2A to FIG. 2D are schematic flowcharts of forming a colored 3D object by applying the color 3D printing apparatus depicted in FIG. 1.

FIG. 2A to FIG. 2D are schematic flowcharts of forming a colored 3D object by applying the color 3D printing apparatus depicted in FIG. 1. With reference to FIG. 2A, the position of the sliding shaft 171 on the Z axis is fixed, and the first and second printing modules 23 and 45 are moved back and forth on the sliding shaft 171 along the X axis; here, the stage 110 is also moved back and forth along the Y axis at the same time. In general, the first printing unit 120 may be equipped with a heater (not shown), so as to heat the first material 123; thereby, the heated and melted first material 123 may be sprayed onto the stage via the print head 122 during the aforesaid moving process.

The first material 123 may be transparent resin composed of acrylonitrile butadiene styrene (ABS) or polylactic acid (PLA), and after the first material 123 is sprayed onto the stage 110, a first material layer 123a in a half-melted state may be formed. Here, the outer profile of the first material layer 123a is consistent with the outer profiles of the colored object units 11 (shown in FIG. 2C), and the first material layer 123a may be a hollow structure; however, in other embodiments of the disclosure, the first material layer 123a may be a solid structure, which should not be construed as a limitation herein.

Figure 2B:
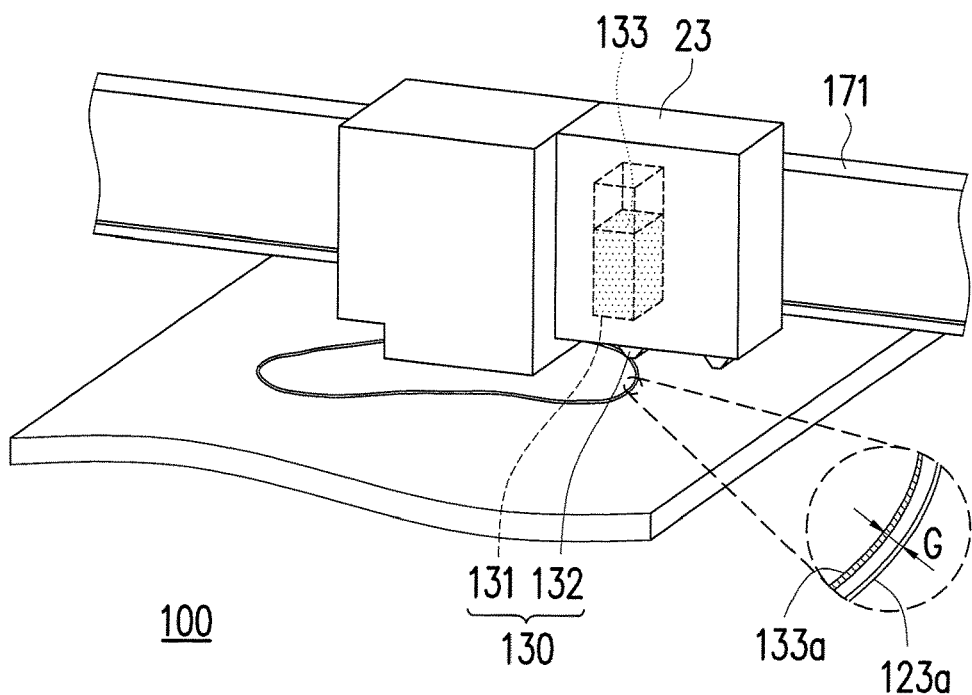

With reference to FIG. 2B, the position of the moving unit 170 on the Z axis remains fixed and unchanged, and the first and second printing modules 23 and 45 are moved back and forth on the sliding shaft 171 along the X axis; here, the stage 110 is also moved back and forth along the Y axis at the same time. The second printing unit 130 may also be equipped with a heater (not shown), so as to heat the second material 133; thereby, the heated and melted second material 133 may be sprayed onto the stage via the print head 132 during the aforesaid moving process. The print head 132 sprays the second material 133 onto the stage 110 substantially along the inner profile of the first material layer 123a.

Particularly, the second material 133 may be white resin composed of ABS or PLA, and after the second material 123 is sprayed onto the stage 110, a second material layer 133a in a half-melted state may be formed. Here, the second material layer 133a may be a hollow structure; however, in other embodiments of the disclosure, the second material layer 133a may be a solid structure, which should not be construed as a limitation herein. On the other hand, a gap G may remain between the first material layer 123a and the second material layer 133a.

Figure 2C:
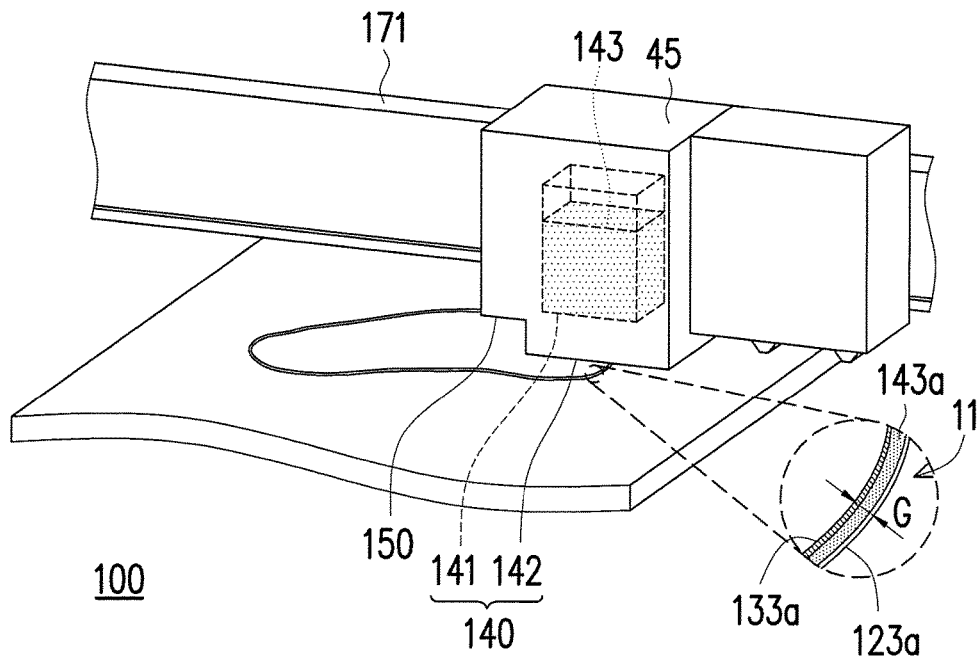

With reference to FIG. 2C, the position of the moving unit 170 on the Z axis still remains fixed and unchanged, and the first and second printing modules 23 and 45 are moved back and forth on the sliding shaft 171 along the X axis; here, the stage 110 is also moved back and forth along the Y axis at the same time. The print head 142 may be a piezoelectric ink-jet print head, for instance; the colored pigment 143 is deposited into the gap G in a lattice-like manner by the print head 142 and is evenly attached to the first material layer 123a and the second material layer 133a. The deposited colored pigment 143 attached to the first material layer 123a and the second material layer 133a are in a semi-liquid state and thus can be cured by the ultraviolet light projected from the curing unit 150 adjacent to the color inkjet printing unit 140, so as to instantly form a colored layer 143a and prevent overflow of the colored pigment 143 in a semi-liquid state. The cured first material layer 123a, the colored layer 143a, and the second material layer 133a are tightly connected and may not be easily removed from one another.

Figure 2D:
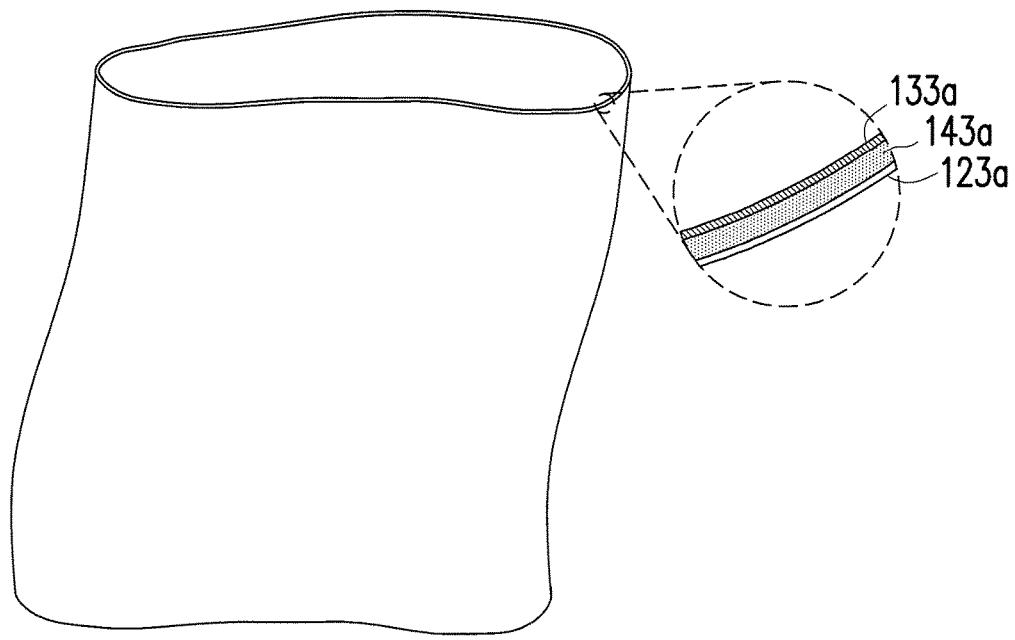

So far, the fabrication of one of the colored object units 11 is about to be completed; after that, the position of the moving unit 170 on the Z axis may be modulated, and the steps shown in FIG. 2A to FIG. 2C may be repeatedly performed, so as to form other colored object units 11 layer by layer and stack the colored object units 11 to form the colored 3D object 10, as shown in FIG. 2D.

Since the first material layer 123a is a transparent layer, and the second material layer 133a is a white layer that can raise the color rendering level of the colored layer 143a, viewers are able to clearly identify the color of the colored layer 143a between the first material layer 123a and the second material layer 133a. In other words, the color 3D printing apparatus 100 and the color 3D printing method provided herein can be applied not only for improving the efficiency of manufacturing the colored 3D object 10 but also for enhancing the color rendering property of the resultant colored 3D object 10.

In the above-mentioned process of manufacturing the colored 3D object 10, the step of forming the second material layer 122a as shown in FIG. 2B and the step of forming the colored layer 143a as shown in FIG. 2C may be exchanged. That is, after the first material layer 123a is formed on the stage 110, the color inkjet printing unit 140 may be applied to deposit the colored pigment 143 onto an inner edge of the first material layer 123a along the inner profile of the first material layer 123a. The curing unit 150 arranged adjacent to the color inkjet printing unit 140 is applied to cure the colored pigment 143, so as to form the colored layer 143a. The second printing unit 130 is then applied to spray the second material 133 onto the stage 110 along the inner profile of the colored layer 143a, and the second material 133 is attached to the inner edge of the colored layer 143a, so as to form the second material layer 133a on the stage 110. Here, the gap G still remains between the first material layer 123a and the second material layer 133a, and the colored layer 143a is located in the gap G. The cured first material layer 123a, the colored layer 143a, and the second material layer 133a can also be tightly connected and may not be easily removed from one another.

Figure 2E:
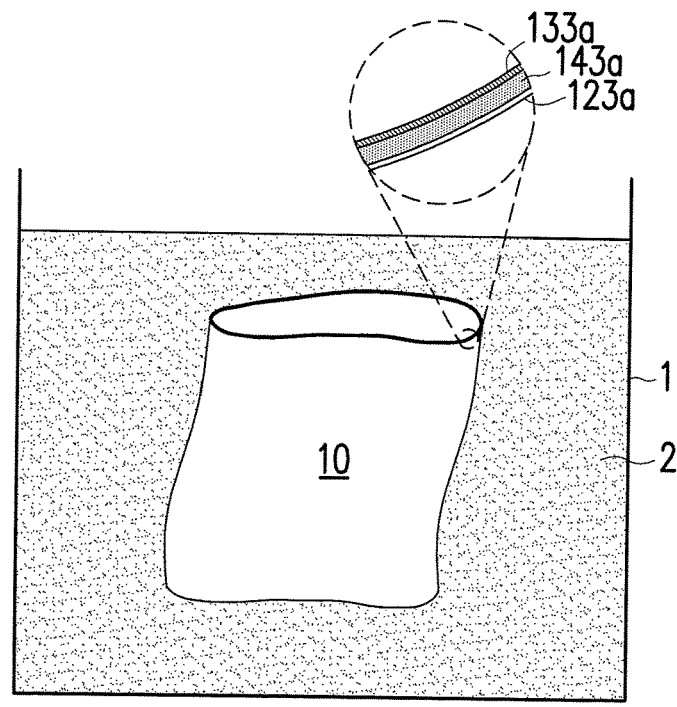
FIG. 2E and FIG. 2F are schematic flowcharts of dissolving the first material layer of the colored 3D object depicted in FIG. 2D.
Figure 2F:
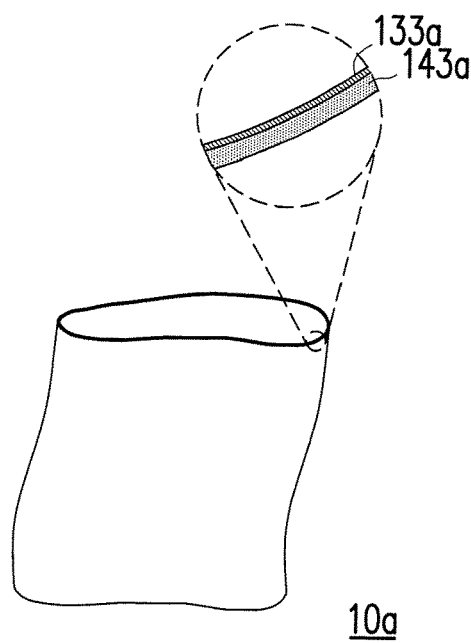

In the previous embodiments, the first material layer 123a is a transparent layer constituted by transparent resin, whereas the disclosure is not limited thereto. FIG. 2E and FIG. 2F are schematic flowcharts of dissolving the first material layer of the colored 3D object depicted in FIG. 2D. With reference to FIG. 2E and FIG. 2F, in the present embodiment, the first material layer 123a may be constituted by colored (or colorless) dissolvable resin. Hence, after the colored 3D object 10 is completely formed, the colored 3D object 10 may be further submerged into a dissolution tank 1, such that the first material layer 123a constituted by the dissolvable resin is dissolved in a solution 2 in the dissolution tank 1, and the colored layer 143a is then exposed. As a result, the colored 3D object 10a is formed. Generally, the solution 2 may be an acid solution, an alkali solution, an organic solution, or any other solution capable of dissolving the first material layer 123a constituted by the dissolvable resin; after the first material layer 123a constituted by the dissolvable resin is dissolved by the solution in the dissolution tank 1, the colored layer 143a is not dissolved by the solution 2. Therefore, the colored 3D object 10a can still be equipped with the intact colored layer 143a and remains ravishing.

Other embodiments are given hereinafter for explanation. It should be mentioned that reference numbers and some descriptions provided in the previous exemplary embodiment are also applied in the following exemplary embodiment. The same reference numbers represent the same or similar components in these exemplary embodiments, and repetitive descriptions are omitted. The omitted descriptions may be found in the previous exemplary embodiments.

Figure 3:
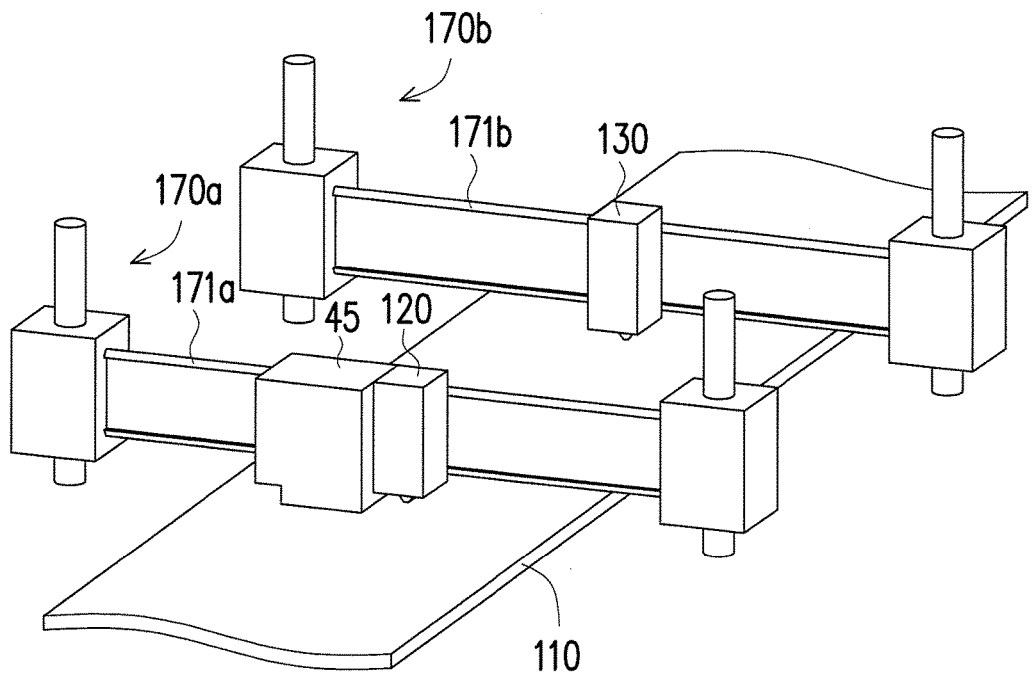
FIG. 3 is a schematic view illustrating a color 3D printing apparatus according to another embodiment of the disclosure.

FIG. 3 is a schematic view illustrating a color 3D printing apparatus according to another embodiment of the disclosure. With reference to FIG. 3, the color 3D printing apparatus 100A is similar to the color 3D printing apparatus 100; the difference therebetween lies in that the color 3D printing apparatus 100A includes moving units 170a and 170b, the first printing unit 120 and the second printing module 45 are movably arranged on the sliding shaft 171a, and the second printing unit 130 is movably arranged on the sliding shaft 171b. That is, the first printing unit 120 and the second printing unit 130 are not integrated as the first printing module 23 in the present embodiment.

Figure 4:
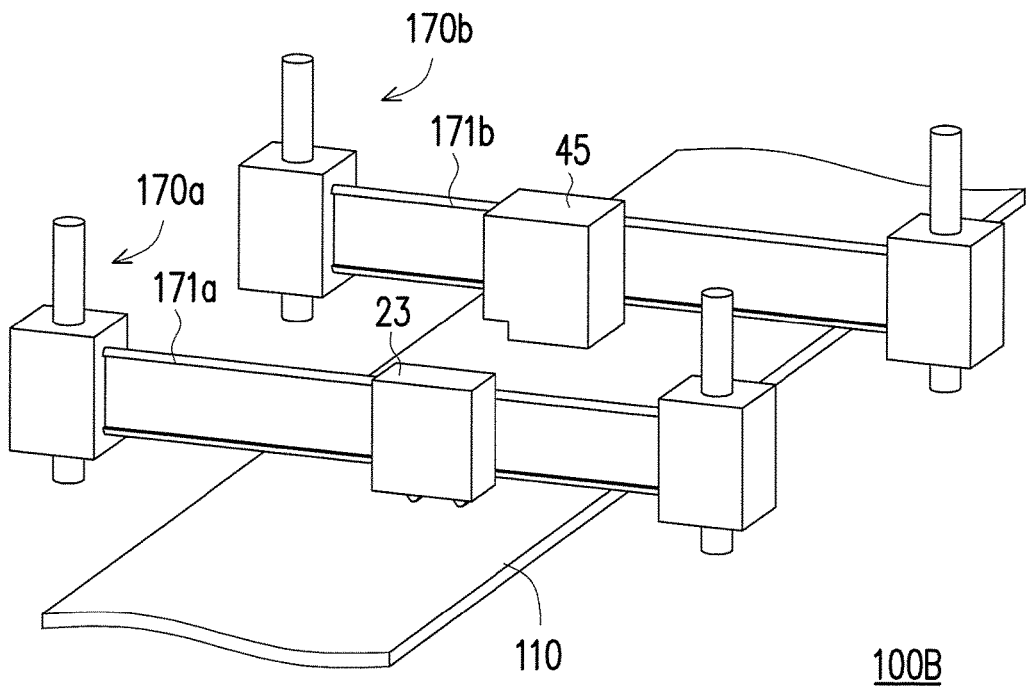
FIG. 4 is a schematic view illustrating a color 3D printing apparatus according to still another embodiment of the disclosure.

FIG. 4 is a schematic view illustrating a color 3D printing apparatus according to still another embodiment of the disclosure. With reference to FIG. 4, the color 3D printing apparatus 100B is similar to the color 3D printing apparatus 100A; the difference therebetween lies in that the first printing unit 120 and the second printing unit 130 in the color 3D printing apparatus 100B are integrated as the first printing module 23 and are movably arranged on the sliding shaft 171a, and the second printing module 45 is movably arranged on the sliding shaft 171b.

To sum up, the color 3D printing apparatus may be applied to print the colored 3D object through conducting the color FDM technique. Here, the first printing unit and the second printing unit may respectively spray a transparent material and a white material onto the stage, so as to form the transparent first material layer and the white second material layer, respectively. Particularly, the second printing unit sprays the white material along the inner profile of the transparent material, and a gap remains between the transparent material and the white material; thereby, in the subsequent manufacturing process, the color inject printing unit may be applied to deposit the colored pigment into the gap, and the deposited colored pigment is attached to the first material layer and the second material layer. The deposited colored pigment attached to the first material layer and the second material layer can then be cured by the ultraviolet light projected from the curing unit adjacent to the color inkjet printing unit, so as to form the colored layer. Since the first material layer is a transparent layer, and the second material layer is a white layer that can raise the color rendering level of the colored layer, viewers are able to clearly identify the color of the colored layer between the first material layer and the second material layer. In other words, the color 3D printing apparatus and the color 3D printing method provided herein can be applied not only for improving the efficiency of manufacturing the colored 3D object but also for enhancing the color rendering property of the resultant colored 3D object.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A color three-dimensional printing method for forming a colored three-dimensional object on a stage, the colored three-dimensional object being composed of a plurality of colored object units stacked together, the color three-dimensional printing method comprising:

forming a first material layer on the stage;

forming a second material layer along an inner profile of the first material layer and providing a colored pigment, wherein a gap remains between the first material layer and the second material layer, and the colored pigment is in the gap; and curing the colored pigment to form a colored layer and forming one of the colored object units containing the first material layer, the colored layer, and the second material layer.

2. The color three-dimensional printing method of claim 1, wherein the colored layer is attached to the first material layer.

3. The color three-dimensional printing method of claim 1, further comprising:

after forming one of the colored object units, continuously forming the other colored object units and stacking the colored object units to form the colored three-dimensional object.

4. The color three-dimensional printing method of claim 3, further comprising:

after forming the colored three-dimensional object, submerging the colored three-dimensional object into a dissolution tank, such that the first material layer is dissolved in a solution in the dissolution tank.

5. The color three-dimensional printing method of claim 4, wherein the solution in the dissolution tank comprises an acid solution, an alkali solution, or an organic solution.

6. The color three-dimensional printing method of claim 1, wherein the first material comprises transparent resin or dissolvable resin, and the second material comprises white resin.

7. The color three-dimensional printing method of claim 1, wherein the colored pigment comprises a red pigment, a cyan pigment, a yellow pigment, a black pigment, a transparent pigment, a white pigment, or a combination thereof.

* * * * *